(12) United States Patent
Beaumont et al.

(10) Patent No.: US 7,628,380 B1
(45) Date of Patent: Dec. 8, 2009

(54) SELF-COMPENSATING PACKING GLAND

(75) Inventors: Joseph H Beaumont, Alto, MI (US); Ronald V Andronaco, Alto, MI (US)

(73) Assignee: Pureflex, Inc., Kentwood, MI (US)

( * ) Notice: Subject to any disclaimer, the term of this patent is extended or adjusted under 35 U.S.C. 154(b) by 802 days.

(21) Appl. No.: 11/247,720

(22) Filed: Oct. 11, 2005

(51) Int. Cl.
    *F16K 31/44* (2006.01)
(52) U.S. Cl. ............................ 251/214; 251/368
(58) Field of Classification Search ............. 251/214, 251/368
    See application file for complete search history.

(56) References Cited

U.S. PATENT DOCUMENTS

| | | | |
|---|---|---|---|
| 3,073,336 A | 1/1963 | Johnson | |
| 3,334,650 A | 8/1967 | Lowrey et al. | |
| 3,863,668 A | 2/1975 | Waters et al. | |
| 4,535,803 A | 8/1985 | Price | |
| 4,540,457 A | 9/1985 | LaValley | |
| 4,556,076 A * | 12/1985 | Bridges | 137/72 |
| 4,696,323 A | 9/1987 | Iff | |
| 5,634,486 A | 6/1997 | Hatting et al. | |
| 5,944,359 A | 8/1999 | Andronaco | |
| 5,979,491 A | 11/1999 | Gonsior | |
| 6,120,006 A * | 9/2000 | Yamaki et al. | 251/214 |
| 6,401,747 B1 * | 6/2002 | Cain et al. | 137/329.03 |
| 6,422,535 B1 | 7/2002 | Stone et al. | |
| 6,458,446 B1 | 10/2002 | Andronaco et al. | |
| 2002/0158221 A1 * | 10/2002 | Sterud | 251/214 |

OTHER PUBLICATIONS

Simendinger, William, "The Design and Application of Advanced Composite Valves", Valve Magazine, vol. 10, No. 2, 1998 (9 pages). Technical Specifications UHMWPE Lined Ball Valves, 2002.

* cited by examiner

*Primary Examiner*—John K Fristoe, Jr.
*Assistant Examiner*—Marina Tietjen
(74) *Attorney, Agent, or Firm*—Van Dyke, Gardner, Linn & Burkhart LLP

(57) ABSTRACT

A valve assembly includes a stem and a body having a passageway for receiving the stem. The diameter of at least an upper portion of the passageway is greater than a diameter of the stem assembly to form a stem space. A packing element is received around the stem assembly in the stem space, and a packing gland is configured to attach to the body and to engage the packing element. The packing gland is attached to the body and applies a compressive force at the packing element, causing the packing element to radially expand and thus substantially seal the packing element and the stem element at the stem space. The packing gland flexes when secured to the body and is biased toward its initial unflexed state to provide a substantially consistent compressive force at the packing element as the packing element deteriorates over time.

17 Claims, 3 Drawing Sheets

SELF-COMPENSATING PACKING GLAND

FIELD OF THE INVENTION

The present invention relates generally to packing glands and, more particularly, to a packing gland mountable onto a body of a valve, pump, motor, or the like that provides a compressive force onto a packing element or seal.

BACKGROUND OF THE INVENTION

Valves or pumps often include a ball connected to a shaft or stem, where the ball and stem rotate together within a body of the valve or pump. Valves and pumps typically include a seal or packing element and a packing gland between the body and the shaft or stem to limit leaking of the valve or pump. The packing gland is mounted onto the body to compress the seal or packing element within the body with a set of fasteners.

Conventional packing glands are generally composed of rigid metals, such as steel. The rigid packing gland is secured to the valve body so as to provide a compressive force at the packing element. During the life of the valve or pump, the seal or packing element deteriorates over time resulting in leaks as the compressive force applied by the packing gland is reduced due to the deterioration of the seal. Accordingly, conventional steel packing glands require repeated periodic adjustment or tightening to prevent leaking of the valves or pumps. In addition, such conventional packing glands may also require the use of a plurality of springs or spring washers, such as Belleville washers, to provide additional spring action onto the packing gland to provide additional pressure onto the packing assembly to prevent leaking of the valve or pump. The Belleville washers are typically positioned between the packing gland and the heads of bolts that mount the packing gland to the valve body, such that the washers urge the rigid packing gland toward the valve body. However, such arrangement requires additional components and may require tightening of the fasteners as the seal deteriorates.

Thus, there is a desire to provide a packing gland assembly which provides an effective compression force at the seal or packing element and overcomes the shortcomings of the prior art.

SUMMARY OF THE INVENTION

The present invention provides a packing gland for a valve which mitigates the above discussed difficulties. The packing gland of the present invention provides a substantially consistent self-compensating compressive force onto a packing element, as the packing element deteriorates over time due to wear and use of the valve. The packing gland of the present invention may eliminate the need for additional springs or spring washers for providing the compressive force. Additionally, the present invention reduces or substantially eliminates the need for repeated monitoring and adjusting or tightening of the packing gland onto the valve body and packing element.

According to one aspect of the present invention, a valve assembly, such as for use in valves, pumps, motors, and the like, includes a stem element and a body having a passageway for receiving the stem element. A diameter of a portion of the passageway is greater than a diameter of the stem element to form a stem space. A packing element or seal is received around the stem element in the stem space. The packing element has a longitudinal dimension along the passageway. A packing gland is configured to attach to the body and receives the stem element therethrough. The packing gland engages the packing element and causes the packing element to radially expand and thus substantially seal the stem element relative to the body. The packing gland flexes when attached to the body and is biased toward an initial unflexed orientation to provide a substantially consistent compressive force at the packing element as the packing element deteriorates over time, and thus as the longitudinal dimension of the packing element is reduced.

The initial unflexed orientation of the packing gland may be substantially planar. The packing gland may be attached to the body via at least one fastener, which is tightened to flex the packing gland so that the packing gland may provide a substantially consistent compressive force onto the packing element as the packing element deteriorates and/or further compresses over time.

The packing gland includes a plate portion and a seal engaging portion, with the seal engaging portion extending from the plate portion to form a stem aperture. The plate portion mounts to the body, and the seal engaging portion engages the packing element. The plate portion flexes when the packing gland is attached to the body and is biased towards its initial unflexed state to maintain the substitutionally consistent compressive force at the packing element as the longitudinal dimension of the packing element is reduced. The packing gland comprises a material having a high flexural yield strength.

According to another aspect of the present invention, a method for providing a self-compensating compressive force in a valve assembly, such as for use in a flow control valve, a pump, a motor, and the like, includes providing a stem in a passageway of a body. The diameter of the passageway is greater than the portion of the stem, so as to define a stem space around a portion of the stem. A packing element is provided in the stem space and around the stem. The packing element has a longitudinal dimension at least partially along the stem space and the stem. A packing gland is secured onto the body with at least one fastener. The packing gland comprises a high flexural yield strength composite material and/or a high strength-to-yield ratio composite material and engages the packing element. The packing gland flexes as the fastener is tightened. The packing gland is biased towards an initial unflexed, generally planar orientation and provides a substantially consistent compressive force onto the packing element as the longitudinal dimension of the packing element reduces over time, in order to substantially seal the stem relative to the body in the stem space throughout a range of reduction in the longitudinal dimension of the packing element.

Therefore, the present invention provides a packing gland for use in valve assemblies, such as for flow control valves, pumps, motors, and the like. The packing gland has an initial unflexed, generally planar state and is composed of an elastic material with a high flexural yield strength, so as to bias the packing gland towards the initial unflexed state when it is flexed. When the packing gland is mounted to a valve body or other body, the packing gland engages the packing element to substantially seal the valve and flexes as the packing gland is secured to the body. The packing gland is biased toward its initial unflexed state and thus is urged against the packing element as the packing element deteriorates over time and as the packing gland unflexes toward its initial unflexed state. The packing gland thus provides a substantially consistent compressive force in a stem space and against the packing element to create a seal that does not require substantial monitoring and repeated adjustment or tightening as the packing element deteriorates over time.

These and other objects, advantages, purposes, and features of the present invention will become apparent upon review of the following specification in conjunction with the drawings.

DESCRIPTION OF THE PREFERRED EMBODIMENTS

Figure 1:
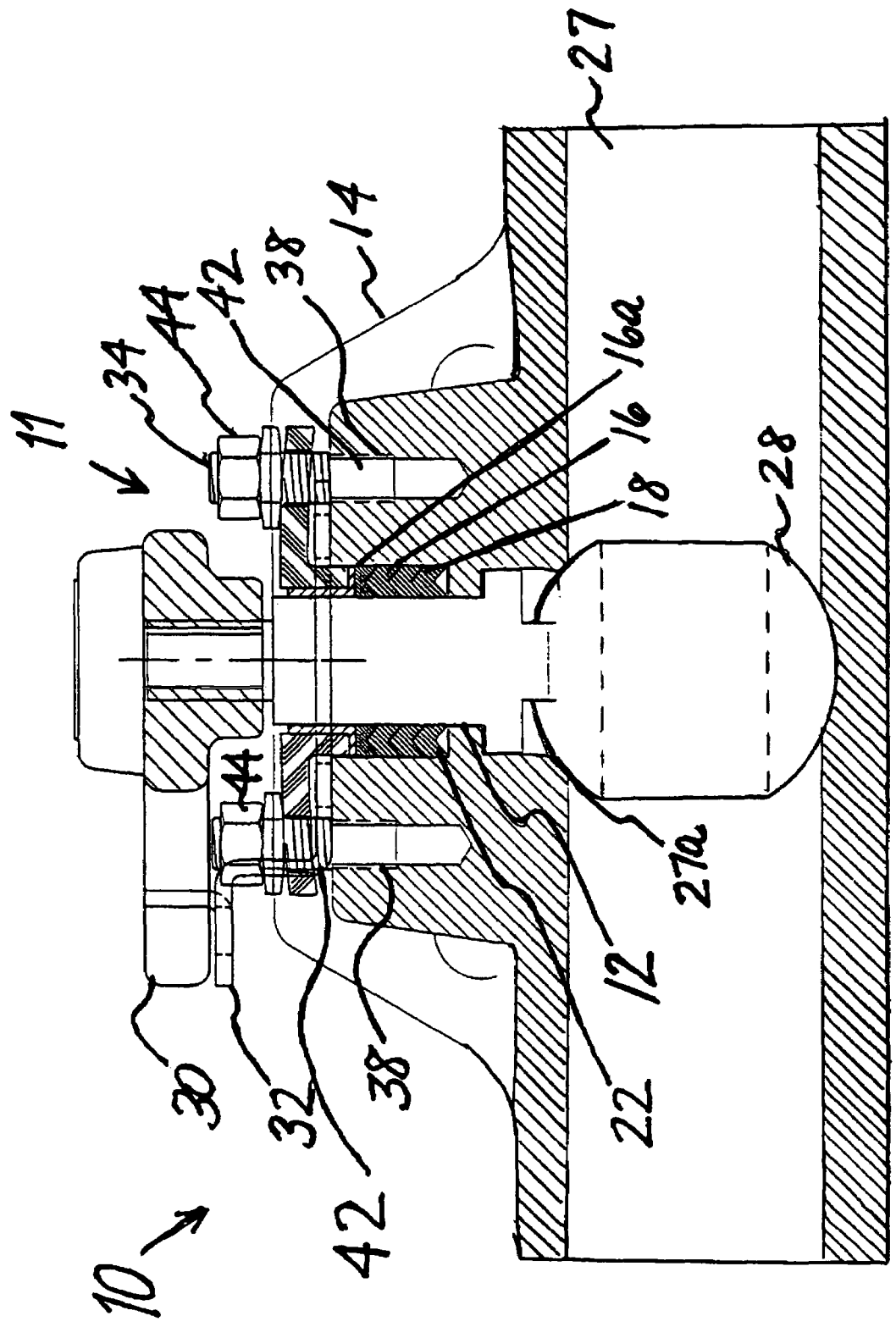
FIG. 1 is a sectional view of a ball valve with a packing gland in accordance with the present invention.

Referring now to the figures, a valve or valve assembly 10, such as for use in pipes, pumps, motors, and the like, according to the present invention, is illustrated in FIG. 1 in an assembled condition. Valve assembly 10 includes a body 14, a stem or shaft 12, a valve member or ball or ball member 28 attached to the stem, and a packing assembly 11 for sealing the stem relative to the body. Packing assembly 11 includes a packing or sealing element or seal 18, a packing gland 20 and at least one fastener 34 for attaching the packing gland to body 14. Packing element 18 is disposed around stem 12 to substantially seal the stem relative to body 14. Packing gland 20 is attached to body 14 and engages packing element 18. As packing gland 20 is secured to body 14, the packing gland flexes from an initial, unflexed state or orientation to a flexed state or orientation to compress packing element 18. Packing gland 20 is biased towards its initial unflexed state so as to apply a generally continuous compressive force at packing element 18 as packing element 18 deteriorates, compresses, and/or reduces over time, as discussed below.

Figure 2:
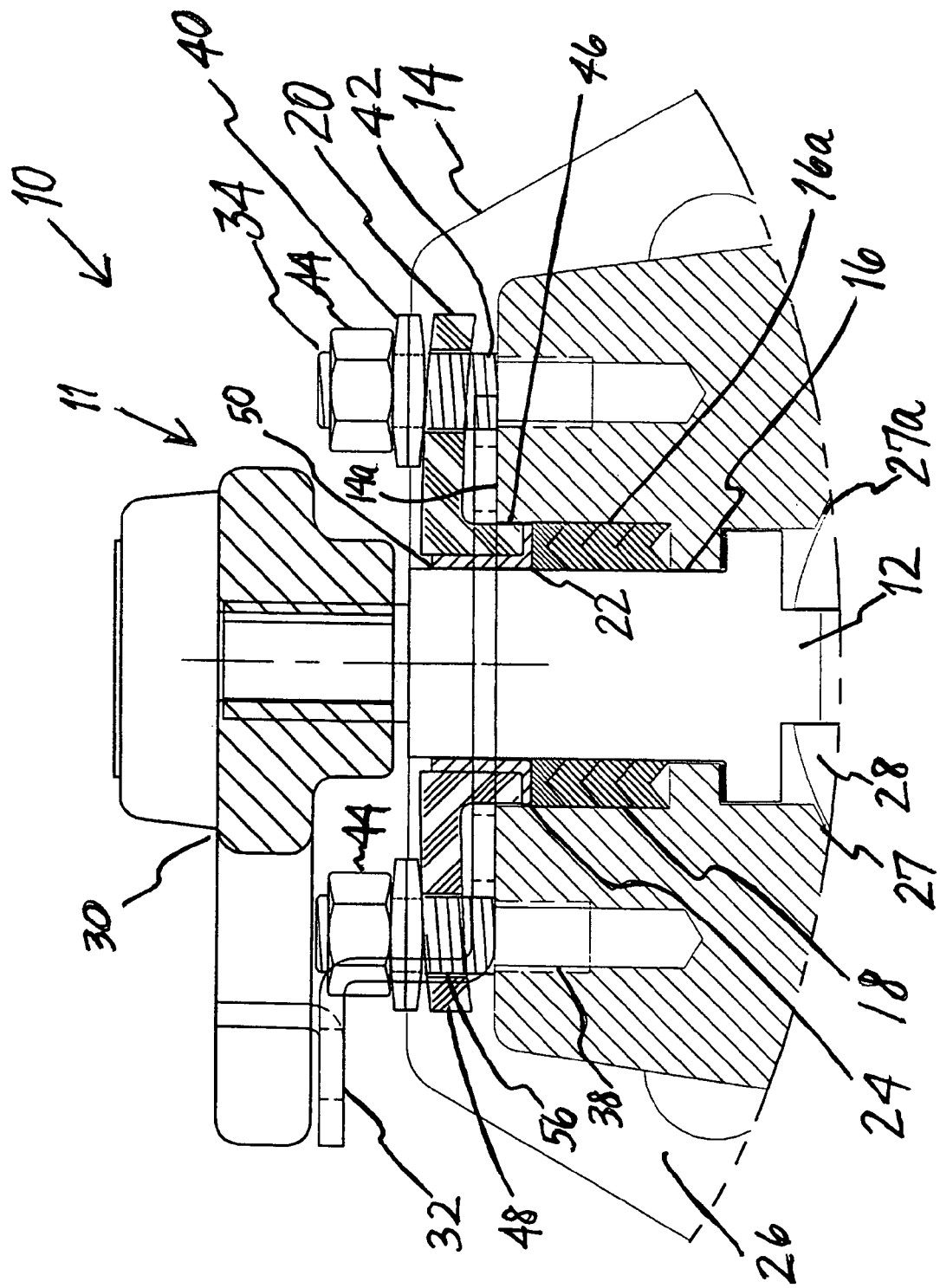
FIG. 2 is an enlarged sectional view of a portion of the valve of FIG. 1.

Valve assembly 10, illustrated in FIGS. 1 and 2 as a ball valve, includes ball member 28. However, the present invention is applicable to all types of valves and the like, such as glove valves, gate valves, butterfly valves, and the like. Body 14 includes a passageway 16 for receiving stem 12 and a channel or fluid flow passageway 27 for receiving ball member 28. The flow of fluids through channel 27 of body 14 is controlled by rotation of ball member 28. Ball member 28 is a generally spherical member with a hole or passageway through its center to allow fluid to flow through the ball member. Ball member 28 is pivotally received in a generally spherical portion 27a of channel 27 of body 14 and is pivoted or rotated via pivotal movement or rotation of stem 12. Ball member 28 substantially seals against the walls of spherical portion 27a of channel 27 to limit fluid flow around ball member 28 around in the channel. When the hole or passageway of ball member 28 generally or at least partially aligns with channel 27 through body 12, the ball member allows fluid to flow through the channel. When valve assembly 10 is closed, such as when ball member 28 is pivoted or rotated so as to be oriented with the passageway generally transverse to channel 27 of body 14, fluid flow is limited or substantially precluded through the channel of the body.

Body 14 defines an upper or outer surface 14a at an outer end of passageway 16. Outer surface 14a may be a generally planar surface and may provide a mounting portion for a handle stop 32 (which may limit rotation of a handle 30, as discussed below) and for packing gland 20. The outer surface 14a of body 14 includes a plurality of recesses 38 or passageways or bores (such as threaded bores) for receiving an associated fastener 34 to secure packing gland 20 to the body. Packing gland 20 thus may be mounted to outer surface 14a of body 14, with stem 12 extending through packing gland 20 and into passageway 16 of body 14, as discussed below.

Stem 12 is connected to ball member 28, with the stem and the ball member rotating together as a unit. A handle 30 is connected at the upper portion of stem 12. Handle 30 assists in rotating or pivoting the stem 12 and ball member 28 within body 14 of valve assembly 10 to control or adjust fluid flow through channel 27 of body 14. Valve assembly 10 may also include handle stop 32 which limits the range of motion of handle 30 in one or both directions.

Stem or shaft 12 is disposed within passageway 16 of body 14. A diameter of at least a portion 16a of passageway 16, preferably an upper most or outer portion (the portion away from channel 27 and toward an outer or upper portion of body 14), is greater than a diameter of a corresponding portion 12a of stem 12 to form a stem space or cavity 22. Stem space 22 is defined by the inside diameter of portion 16a of passageway 16 and the outside diameter of the corresponding portion 12a of stem assembly 12. Stem space 22 receives packing element 18 therein, such that the packing element is received between body 14 and stem 12 to substantially seal the stem relative to the body, as discussed below. Stem space 22 may also receive a bearing element 24 to provide an interface between packing element 18 and packing gland 20, as discussed below.

Packing element 18 comprises a soft sealing material that preferably compresses longitudinally so as to radially expand to create a seal in stem space 22, in order to limit or substantially preclude leaks between the packing element 18, body 14, and stem 12 in stem space 22. Packing element 18 may consist of a single sealing element or ring or may consist of a plurality of packing elements or seals or seal portions, without affecting the scope of the present invention.

As shown in FIGS. 1 and 2, bearing 24 may be received between packing element 18 and packing gland 20 within stem space 22. Bearing 24 engages packing element 18 to assist in maintaining the substantially consistent compressive force of packing gland 20 against the packing element, as discussed below. Additionally, bearing assembly 24 may function to retain packing element 18 in place when stem assembly 22 is displaced or rotated within passageway 16.

Figure 3A:
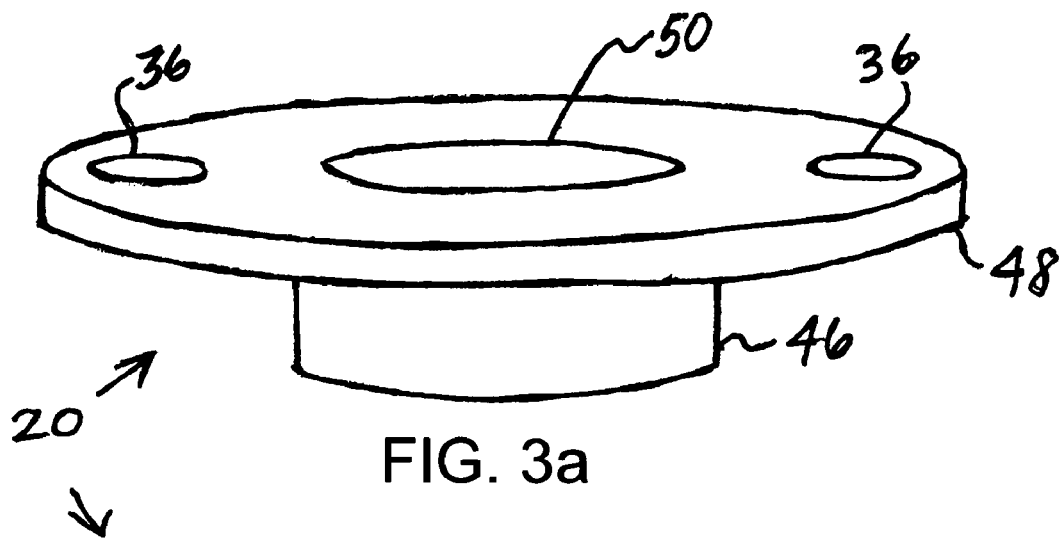
FIG. 3A is a side perspective view of a packing gland of the present invention, shown in its initial unflexed orientation.
Figure 3B:
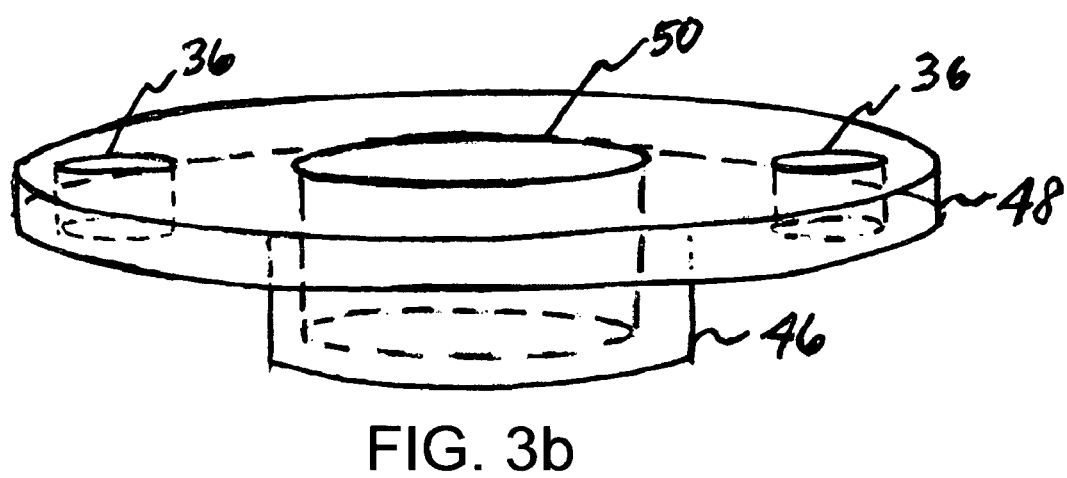
FIG. 3B is another side perspective view of the packing gland of FIG. 3A with phantom lines for apertures.
Figure 3C:
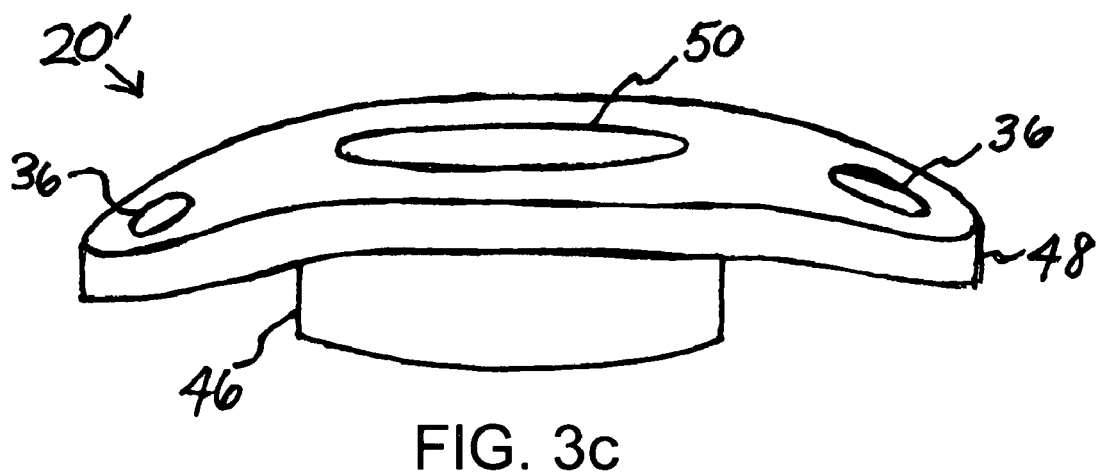
FIG. 3C is another side perspective view of a packing gland in a flexed orientation.

Packing gland 20 is preferably unitarily formed and includes a seal engaging portion 46 and a plate portion 48, as best illustrated in FIGS. 3A-C. Packing gland 20 includes or defines a stem receiving aperture or passageway 50 therethrough for receiving stem 12. In the illustrated embodiments, seal engaging portion 46 is a cylindrical body or portion extending from a central region of plate portion 48. Seal engaging portion 46 engages packing element 18 and/or bearing 24 when packing gland 20 is attached to body 14, as discussed below.

Plate portion 48 is located at the upper most or outer most portion of seal engaging portion 46 and extends radially outward from seal engaging portion 46. Plate portion 48 includes a plurality of fastener apertures 36 at a radially outward region for receiving fasteners 34 for mounting packing gland 20 at bores 38 at outer surface 14a of body 14. Plate portion 48 preferably includes two fastener apertures 36 at opposite sides or ends of plate portion 48, but may include more to secure the packing gland to body 14 at multiple places.

Packing gland 20 is composed of an elastic material having a high strength-to-yield ratio, preferably a fiberglass composite material such as, for example, Durcor 62 Vinyl Ester/Fiberglass composite material, or the like. The high strength-to-yield ratio material of packing gland 20 is elastically deformable to deform or flex under load, without plastically deforming, even at substantially high loads. Some material properties of the Durcor 62 Vinyl Ester/Fiberglass composite include: a flexural strength or flexural yield strength of approximately 85,000 psi and a flexural modulus of approximately $3.0 \times 10^6$ psi, as established via the American Standard for Testing and Measurement Flexural Test ASTM D790, a tensile strength of approximately 50,000 psi and a tensile modulus of approximately $3.9 \times 10^6$ psi, as established via ASTM D638, a compressive strength of approximately 42,000 psi and a compressive modulus of approximately $2.7 \times 10^6$ psi as established via ASTM D695. While such properties or characteristics provide a preferred material, other polymeric materials with a similar or suitable high yield strength may be implemented. Preferably, the selected material provides a flexural modulus in a range of approximately $2.64 \times 10^6$ psi to approximately $3.36 \times 10^6$ psi or thereabouts. Preferably, the selected material of the packing gland also provides a flexural yield strength of at least approximately 75,000 psi.

Although packing gland 20 is shown and described as being unitarily formed, it is envisioned that the packing gland may comprise a separate plate portion and seal engaging portion. The plate portion may engage an outer end of the seal engaging portion to urge the seal engaging portion toward the packing element as the plate portion is secured to the body. The plate portion may comprise an elastic, high yield strength material so as to be biased towards its initial unflexed state as described above, while the seal engaging portion may comprise any suitable metallic or polymeric material.

As shown in FIGS. 1 and 2, fasteners 34 may include a stud or bolt or male fastening element 42 and a nut or female fastening element 44. Stud 42 is threaded into bores 38 of body 14 so as to protrude outwardly from mounting surface 14a of body 14. Packing gland 20 is positioned at mounting surface 14a so that studs 42 protrude through apertures 36 in plate portion 48 of the packing gland, whereby nuts 44 are threaded onto studs 42 and tightened to secure the packing gland to body 14. Optionally, washers 40 may be utilized to assist in securing nut 44 onto to stud 42 and to provide a greater contact surface area downward onto packing gland 20. Nuts 44 may provide a curved engaging surface for substantially engaging plate portion 48 of packing gland 20, even as the plate portion flexes as the nuts are tightened, as discussed below.

Although shown and described as having stud 42 and nut 44, the fastener may comprise other types of fastening elements, such as a single bolt or the like, while performing the function of the stud and nut, without affecting the scope of the present invention. The bolt may include a head portion for rotating and tightening the bolt to secure packing gland 20 onto body 14. Optionally, it is envisioned a single fastener could be utilized to secure the packing gland to the body, while keeping within the scope of the present invention. For example, the plate portion may receive a fastener on one side, while the other side of the plate portion may be secured to the body via a clip, tab, or the like.

Accordingly, when attached to body 14, packing gland 20 receives stem 12 through stem aperture 50 and studs 42 through fastener apertures 36 of plate portion 48, in order to position packing gland 20 at surface 14a of body 14 via studs 42. When packing gland 20 is positioned at surface 14a of body 14 with stem 12 and studs 42 protruding through packing gland 20, nuts 44 are threaded onto the respective studs 42 to secure packing gland 20 to body 14. Washers 40 may optionally be positioned on studs 42 and between packing gland 20 and nuts 44, so that nuts 44 are threaded onto studs 42 over washers 40 and packing gland 20.

When packing gland 20 is positioned at surface 14a of body 14, seal engaging portion 46 of packing gland 20 is received within stem space 22 and engages bearing 24, which engages packing element 18. As nuts 44 are tightened, the nuts exert a downward force (or a force toward body 14) at opposite sides or ends of plate portion 48 of packing gland 20 to draw the ends of the plate portion toward mounting surface 14a of the body. Because seal engaging portion 46 of packing gland 20 is engaged with bearing 24 and packing element 18, further movement of seal engaging portion 46 into and along stem space 16 is limited by the resistance provided by packing element 18. Thus, plate portion 48 of packing gland 20 flexes so that outer regions of plate portion 48 flex toward body 14 as nuts 44 are tightened. Thus, nuts 44 cause packing gland 20 to flex from its initial unflexed, generally planar orientation or state (FIGS. 3A and 3B), to a flexed orientation or state (FIGS. 1, 2, and 3C), while seal engaging portion 46 acts to compress packing element 18 within stem space 22. When so flexed, the outer regions of plate portion 48 may be flexed toward and may contact outer surface 14a of body 14, while the central portion of plate portion 48 may be spaced outwardly from outer surface 14a of body 14.

Due to the elastic, high yield strength material, such as a fiberglass composite or other suitable material, of packing gland 20, the packing gland flexes elastically as the nuts are tightened, but does not yield or plastically deform. The flexing functions to load or set packing gland 20 to provide the desired compressive force at packing element 18 to energize, squeeze, or compress the soft seal material of the packing element within stem space 22. The biased or loaded packing gland 20 thus, as nuts 44 are tightened to flex the packing gland, exerts a compressive force at packing element 18 via engagement of seal engaging portion 46 with bearing 24 and/or the packing element. When the compressive force is applied at packing element 18, the packing element may compress longitudinally and thus expand radially to substantially seal the packing element against the body wall of stem space 22 and against stem 12 to limit or substantially preclude leaking during rotation of the stem and ball 28 relative to body 14.

The material and size and shape of packing element 18 is selected to be sufficient to limit or substantially preclude leaks between the packing element, body 14, and stem 12 in stem space 22 as packing gland 20 applies the compressive force onto the packing element. However, as packing element 18 deteriorates over time, such as via wear of the packing element that typically occurs from use of the valve, the longitudinal dimension (the dimension along a longitudinal axis of stem 12 and passageway 16) of the packing element may be further reduced as it is compressed by packing gland 20. Thus, the position of seal engaging portion 46 of packing gland 20 may change as a result of the loss or reduction of material along the longitudinal dimension of the packing element and/or as a result of the reduced resistance by the packing element. Because the flexed packing gland 20 is biased (via its inherent material properties and characteristics) toward its initial, unflexed state, the packing gland at least partially unflexes as the longitudinal dimension of packing element 18 is reduced, so as to move or urge the central region of the plate portion toward outer surface 14a of body 14 to substantially maintain the desired or appropriate compressive force at the packing element throughout a range of longitudinal dimensions of packing element. Thus, packing gland 20 unflexes toward its initial unflexed, generally planar orientation, and provides a self-compensating, substantially consistent compressive force at bearing 24 and packing element 18 to compensate for the change or reduction in the longitudinal dimension of the packing element from the deterioration of the packing element, in order to limit or substantially preclude leaking between the packing element, stem assembly 12, and body 14 in stem space 22 over time. Initially, packing element 18 resists the biasing or urging of packing gland 20 toward the packing element, but as the packing element wears or deteriorates, any reduction in the packing element material or in the strength and/or resistance of the packing element is accommodated by the packing gland, whereby the seal engaging portion of the packing gland moves further into engagement with the packing element to further compress (or maintain sufficient compression of) the packing element as the plate portion is urged or unflexed toward its initial, unflexed state. Thus, packing gland 20 compensates for the deterioration of packing element 18 to provide a substantially consistent and continuous compressive force at the packing element, without requiring repeated monitoring or adjustment or tightening of the packing gland as the packing element wears.

Although shown and described as implemented at a ball valve, the packing gland of the present invention is equally suited for other types of fluid flow control assemblies that control the flow of fluid therethrough, such as valves, pumps, motors or the like. The packing gland may compress a packing or sealing element to seal various stem elements or shafts or members, which may be displaced within a stem space, relative to a body or body member of a valve or pump or motor or the like, without affecting the scope of the present invention.

Therefore, the present invention provides a packing assembly for use in valves, pumps, motors and the like. The packing assembly includes a self-compensating packing gland comprising an elastic material with elastic deformation and high yield strength properties. The packing gland thus may elastically deform or flex when mounted to the body and is biased toward its initial, unflexed state. The packing gland is biased to provide a substantially consistent compressive force at the packing element in the stem space as the packing element deteriorates or compresses over time. The self-compensating packing gland of the present invention thus compensates for a loss or reduction of the material or longitudinal dimension of the packing element, such as may be due to degradation or compression of the packing element, and provides a substantially consistent compressive force against the packing element to limit or substantially preclude leaks between the stem assembly and the body of a valve, pump, motor, or the like. The present invention thus may eliminate the need for utilizing springs or spring washers, such as Belleville washers at the packing gland of the valve. Moreover, the present invention reduces the need to monitor and repeatedly adjust the compressive force of the packing gland over the life of the seal and/or valve, since the packing gland maintains the compressive force as the packing gland unflexes toward its initial unflexed state to accommodate any reduction in the material or resistance of the packing element.

While a preferred embodiment of the present invention is described above, it is contemplated that variations will be developed within the teaching of the present disclosure. Changes and modifications to the specifically described embodiments may be carried out without departing from the principles of the present invention, which is intended to be limited only by the scope of the appended claims as interpreted according to the principles of patent law.

The invention claimed is:

1. A valve assembly for use in valves, pumps, motors, and the like, said valve assembly comprising:
   a stem element;
   a body having a passageway for receiving said stem element, a diameter of a portion of said passageway being greater than a diameter of said stem element to form a stem space;
   a packing element received around said stem element in said stem space, said packing element having a longitudinal dimension along said passageway;
   a packing gland configured to attach to said body, said packing gland receiving said stem element therethrough, said packing gland applying a compressive force at said packing element and causing said packing element to radially expand and thus substantially seal said stem element relative to said body;
   wherein said packing gland flexes from an initial unflexed state to a flexed state when attached to said body, said packing gland being biased toward said initial unflexed state to provide a substantially consistent compressive force at said packing element as said packing element deteriorates over time;
   wherein said elastic material has a flexural modulus in a range of approximately $2.6 \times 10^6$ psi to approximately $3.4 \times 10^6$ psi; and
   wherein said packing gland comprises a fiberglass composite material.

2. The valve assembly of claim 1 wherein said packing gland is substantially planar when in said initial unflexed state.

3. The valve assembly of claim 1 further comprising a bearing element received between said packing gland and said stem assembly in said stem space, said bearing element engaging said packing element and said packing gland engaging said bearing element.

4. The valve assembly of claim 1, wherein said stem element is connected to a valve element, and said stem element rotates within said passageway to rotate said valve element to control fluid flow through said body.

5. The valve assembly of claim 1 wherein said packing gland is attached to said body via at least one fastener, said fastener being tightened to flex said packing gland to said flexed state.

6. The valve assembly of claim 5, wherein said packing gland comprises a plate portion and a seal engaging portion extending from said plate portion, said plate portion being configured to mount to said body, said seal engaging portion extending along said passageway and applying said compressive force at said packing element.

7. The valve assembly of claim 6, wherein said plate portion extends laterally from said seal engaging portion and is attachable to said body at opposite sides of said plate portion, said seal engaging portion extending longitudinally from said plate portion to protrude into said stem space to apply said compressive force at said packing element.

8. The valve assembly of claim 7, wherein movement of said seal engaging portion is at least initially limited by said packing element such that tightening of said at least one fastener causes said plate portion to flex toward said body and toward said flexed state.

9. The valve assembly of claim 8, wherein said plate portion is attached to said body via a pair of fasteners at opposite sides of said plate portion.

10. The valve assembly of claim 1 wherein said packing gland comprises an elastic material having a flexural yield strength of at least approximately 75000 psi.

11. The valve assembly of claim 1 wherein at least one fastener is tightened to secure said packing gland to said body and to flex said packing gland, whereby material properties of said packing gland function to bias said packing gland toward said initial unflexed state thereby exerting said compressive force at said packing element throughout a range of longitudinal dimensions of said packing element.

12. A packing assembly for use in a fluid flow control assembly, said fluid flow control assembly including a body having a passageway, said packing assembly comprising:
- a stem element configured to be received in said passageway, a diameter of at least a portion of said passageway being greater than a diameter of said stem to form a stem space;
- a packing element received around said stem element, said packing element having a longitudinal dimension along said stem element;
- a packing gland having a initial unflexed orientation, said packing gland being configured to attach to said body and to apply a compressive force against said packing element when said packing gland is attached to said body;
- at least one fastener for attaching said packing gland to said body;
- wherein said packing gland flexes to a flexed orientation when said at least one fastener is tightened to attach said packing gland to said body, said packing gland being biased toward said initial unflexed orientation to provide a substantially consistent compressive force at said packing element over a range of longitudinal dimensions of said packing element to seal said stem element relative to said body as said longitudinal dimension of said packing element is reduced;
- wherein said packing gland comprises an elastic material having a flexural modulus in a range of approximately $2.6 \times 10^6$ psi to approximately $3.4 \times 10^6$ psi, and
- wherein said packing gland comprising a fiberglass composite material.

13. The packing assembly of claim 12 wherein said packing gland comprises an elastic material having a flexural yield strength of at least approximately 75000 psi.

14. The packing assembly of claim 12, wherein said packing gland comprises a plate portion and a seal engaging portion extending longitudinally from said plate portion, said plate portion extending radially from said seal engaging portion for attaching to said body, said seal engaging portion extending into said passageway to apply said compressive force at said packing element when said plate portion of said packing gland is attached to said body via said at least one fastener.

15. The packing assembly of claim 14, wherein said plate portion flexes from said initial unflexed orientation to said flexed orientation when attached to said body, said plate portion being biased toward said initial unflexed orientation to provide said substantially consistent compressive force.

16. The packing assembly of claim 15, wherein said at least one fastener comprises two fasteners and said plate portion is mounted to said body via said fasteners at or near opposite ends of said plate portion.

17. The packing assembly of claim 16, wherein movement of said seal engaging portion is at least initially limited by said packing element such that tightening of said fasteners causes said plate portion to flex toward said body and toward said flexed state.

* * * * *